US012542844B2

(12) United States Patent
Chen et al.

(10) Patent No.: US 12,542,844 B2
(45) Date of Patent: Feb. 3, 2026

(54) ELECTRONIC DEVICE AND CONTROL METHOD THEREOF

(71) Applicant: VIVO MOBILE COMMUNICATION CO., LTD., Dongguan (CN)

(72) Inventors: Junhui Chen, Dongguan (CN); Lele Li, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 355 days.

(21) Appl. No.: 18/134,640

(22) Filed: Apr. 14, 2023

(65) Prior Publication Data

US 2023/0254395 A1 Aug. 10, 2023

Related U.S. Application Data

(63) Continuation of application No. PCT/CN2021/125483, filed on Oct. 22, 2021.

(30) Foreign Application Priority Data

Oct. 22, 2020 (CN) ......................... 202011143796.8

(51) Int. Cl.
*H04M 1/19* (2006.01)
*H04M 1/03* (2006.01)

(52) U.S. Cl.
CPC ............. *H04M 1/19* (2013.01); *H04M 1/035* (2013.01)

(58) Field of Classification Search
CPC ...... H04M 1/035; H04M 1/19; H04B 1/3888; H04R 1/2876; H04R 1/342; H04R 2410/07; H04R 2499/11; H04R 3/12; H04R 1/2823; H04R 1/02; H04R 1/028; H04R 2499/15; H04R 1/2873; G10K 11/16
See application file for complete search history.

(56) References Cited

U.S. PATENT DOCUMENTS 9,843,866 B2 12/2017 Yan et al.
10,820,090 B2 10/2020 Yu et al.
(Continued)

FOREIGN PATENT DOCUMENTS

CN 103369440 A 10/2013
CN 206962878 U 2/2018
(Continued)

*Primary Examiner* — Angelica Perez
(74) *Attorney, Agent, or Firm* — The Webb Law Firm

(57) ABSTRACT

In an electronic device, a first sound generating module is disposed in a first accommodating cavity; and a second sound generating module is disposed in an accommodating space; when the first sound generating module is in a first operating state, the second sound generating module is in a second operating state, the first sound generating module outputs a first vibration signal to a housing, and the second sound generating module outputs a second vibration signal to the housing; or sound waves emitted by the first sound generating module form first sound waves in the first accommodating cavity, and sound waves emitted by the second sound generating module form second sound waves in the first accommodating cavity; or the first sound generating module outputs a first vibration signal to a housing, and sound waves emitted by the second sound generating module form second sound waves in the first accommodating cavity.

19 Claims, 3 Drawing Sheets

(56) References Cited

U.S. PATENT DOCUMENTS

| | | | | |
|---|---|---|---|---|
| 11,374,506 | B2 | 6/2022 | Ge | |
| 2014/0315605 | A1* | 10/2014 | Cho | H04M 1/035 455/575.1 |
| 2019/0320277 | A1 | 10/2019 | Kelloniemi et al. | |
| 2019/0373360 | A1* | 12/2019 | Yu | H04R 1/2811 |

FOREIGN PATENT DOCUMENTS

| | | | | |
|---|---|---|---|---|
| CN | 108989514 | A | 12/2018 | |
| CN | 208540153 | U | 2/2019 | |
| CN | 110381183 | A | 10/2019 | |
| CN | 110475002 | A | * 11/2019 | H04M 1/0295 |
| CN | 111131975 | A | 5/2020 | |
| CN | 211089956 | U | 7/2020 | |
| CN | 211266905 | U | 8/2020 | |
| CN | 111756903 | A | 10/2020 | |
| CN | 112261202 | A | 1/2021 | |
| JP | 2003023482 | A | 1/2003 | |
| JP | 2013062708 | A | 4/2013 | |

* cited by examiner

ELECTRONIC DEVICE AND CONTROL METHOD THEREOF

CROSS-REFERENCE TO RELATED APPLICATIONS

This application is a Bypass Continuation Application of PCT/CN2021/125483 filed Oct. 22, 2021, and claims priority to Chinese Patent Application No. 202011143796.8 filed Oct. 22, 2020, the disclosures of which are hereby incorporated by reference in their entireties.

BACKGROUND OF THE INVENTION

Field of the Invention

This application relates to the technical field of communication devices, and in particular, to an electronic device, and a control method and control apparatus thereof.

Description of Related Art

With the rapid development of electronic devices, electronic devices are more widely used. Electronic devices such as mobile phones and tablet computers play more roles in work, life, and entertainment of people.

Currently, most electronic devices have a housing. The housing can protect internal components of the electronic devices.

SUMMARY OF THE INVENTION

According to a first aspect, an embodiment of this application discloses an electronic device, including:

a housing, having an accommodating space, where the accommodating space includes a first accommodating cavity, and an inner wall of the housing forms at least a portion of a cavity wall of the first accommodating cavity;

a first sound generating module, disposed in the first accommodating cavity; and a second sound generating module, disposed in the accommodating space, where in a case that both the first sound generating module and the second sound generating module are in contact with the cavity wall, when the first sound generating module is in a first operating state, the second sound generating module is in a second operating state, the first sound generating module outputs a first vibration signal to the housing, and the second sound generating module outputs a second vibration signal to the housing;

in a case that both the first sound generating module and the second sound generating module are spaced from the cavity wall, when the first sound generating module is in a first operating state, the second sound generating module is in a second operating state, sound waves emitted by the first sound generating module form first sound waves in the first accommodating cavity, and sound waves emitted by the second sound generating module form second sound waves in the first accommodating cavity; or in a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity, where a phase of the first vibration signal is opposite to a phase of the second vibration signal, a phase of the first sound waves is opposite to a phase of the second sound waves, and the phase of the first vibration signal is the same as the phase of the first sound waves.

According to a second aspect, an embodiment of this application discloses a control method of an electronic device, where the electronic device includes a housing, the housing has an accommodating space, the accommodating space includes a first accommodating cavity, and an inner wall of the housing forms at least a portion of a cavity wall of the first accommodating cavity; a first sound generating module, disposed in the first accommodating cavity; and a second sound generating module, disposed in the accommodating space, where in a case that both the first sound generating module and the second sound generating module are in contact with the cavity wall, when the first sound generating module is in a first operating state, the second sound generating module is in a second operating state, the first sound generating module outputs a first vibration signal to the housing, and the second sound generating module outputs a second vibration signal to the housing; in a case that both the first sound generating module and the second sound generating module are spaced from the cavity wall, when the first sound generating module is in a first operating state, the second sound generating module is in a second operating state, sound waves emitted by the first sound generating module form first sound waves in the first accommodating cavity, and sound waves emitted by the second sound generating module form second sound waves in the first accommodating cavity; or in a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity, where a phase of the first vibration signal is opposite to a phase of the second vibration signal, a phase of the first sound waves is opposite to a phase of the second sound waves, and the phase of the first vibration signal is the same as the phase of the first sound waves; and the control method includes:

obtaining a first audio parameter of the first sound generating module in a case that the first sound generating module is in the first operating state; and controlling, according to the first audio parameter, the second sound generating module to be in the second operating state, and controlling the second sound generating module to operate according to a second audio parameter.

According to a third aspect, an embodiment of this application discloses a terminal device, including a processor, a memory, and a program or an instruction stored in the memory and executable on the processor, where when the program or the instruction is executed by the processor, steps of the foregoing control method are implemented.

According to a fourth aspect, an embodiment of this application discloses a non-transitory computer-readable storage medium, storing a program or an instruction, where when the program or the instruction is executed by a processor, steps of the foregoing control method are implemented.

According to a fifth aspect, an embodiment of this application discloses a chip, including a processor and a communication interface coupled to the processor, where the processor is configured to execute a program or an instruction to implement the control method according to the second aspect.

According to a sixth aspect, an embodiment of this application discloses a non-transitory computer program product, stored in a non-volatile storage medium, where when the non-transitory computer program product is executed by at least one processor, steps of the foregoing control method are implemented.

DESCRIPTION OF REFERENCE NUMERALS

Figure 1:
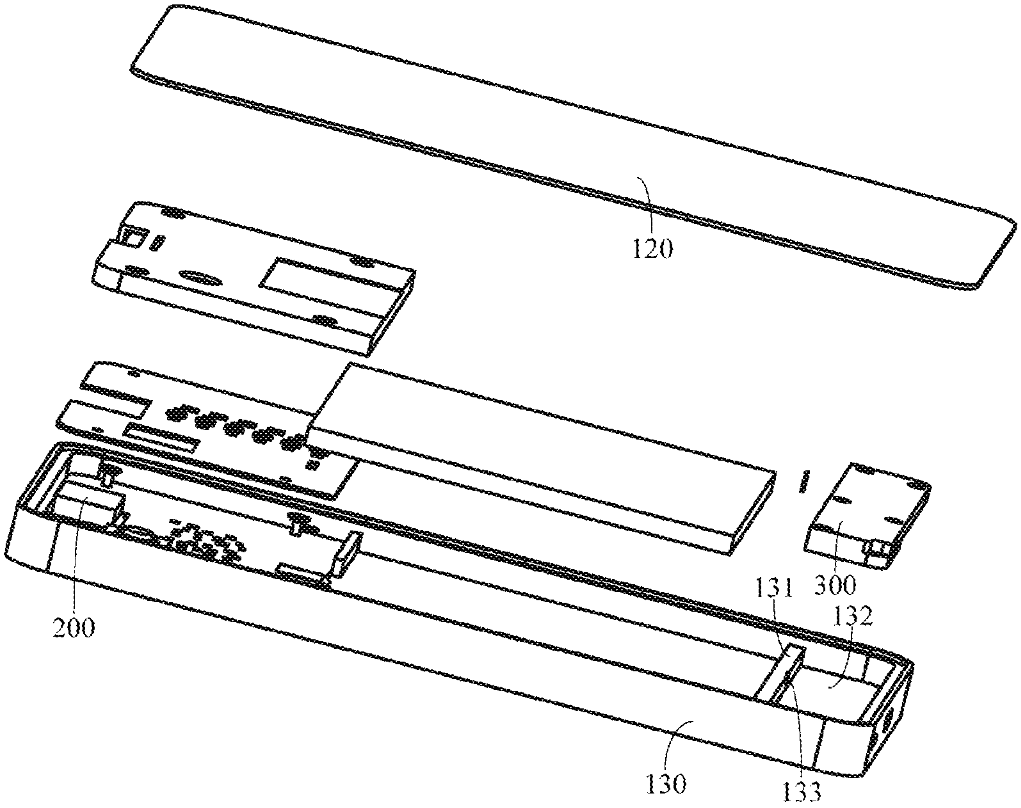
FIG. 1 is a schematic exploded view of an electronic device disclosed in an embodiment of this application.
Figure 2:
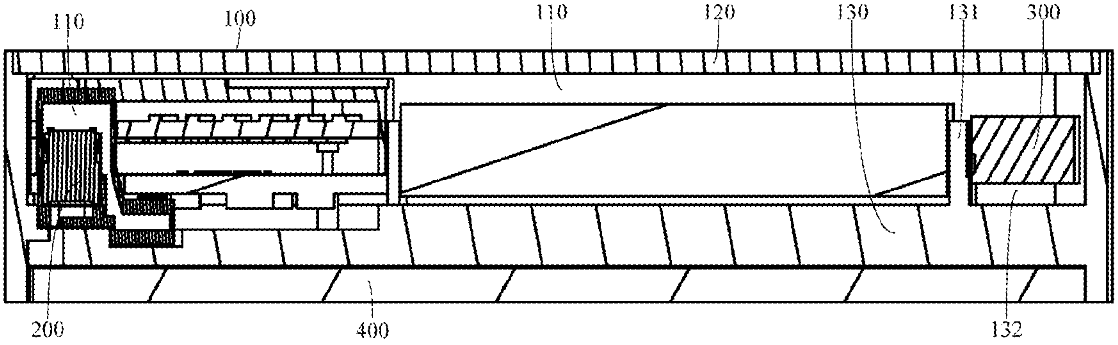
FIG. 2 is a cross-sectional view of an electronic device disclosed in an embodiment of this application.
Figure 3:
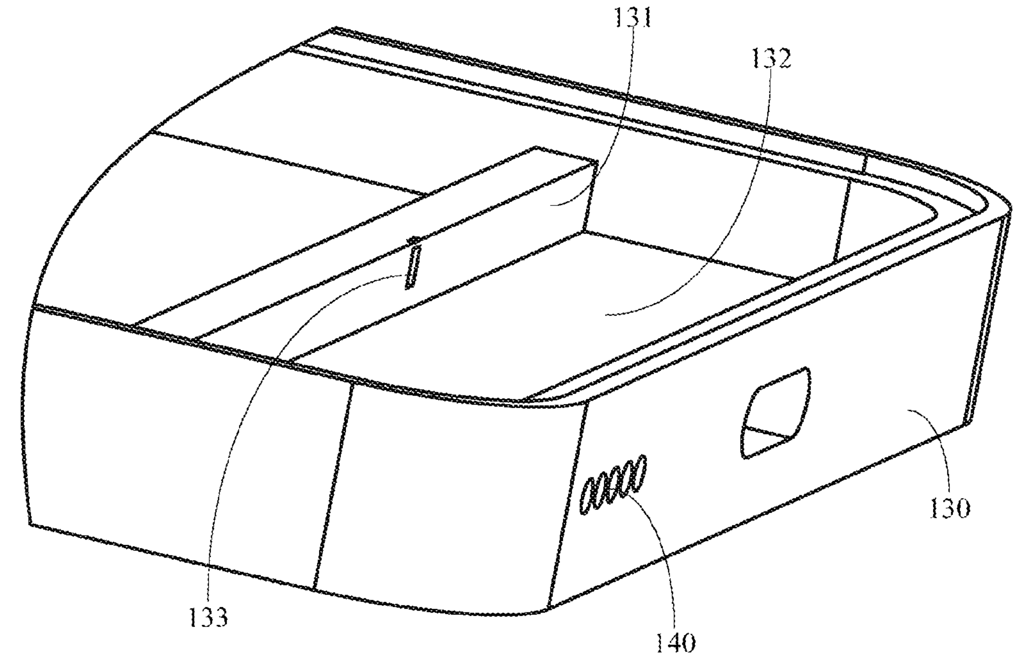
FIG. 3 is a schematic partial diagram of a housing disclosed in an embodiment of this application.
Figure 4:
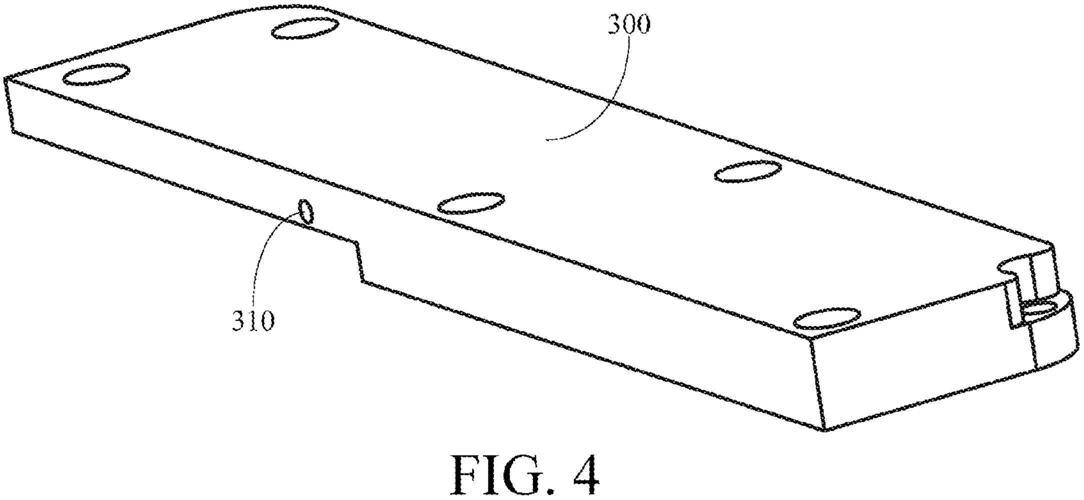
FIG. 4 is a schematic diagram of a second sound generating module disclosed in an embodiment of this application.

100—housing, 110—first accommodating cavity, 120—rear cover, 130—middle frame, 131—raised part, 132—first mounting cavity, 133—sound guide channel, 140—second sound guide hole, 200—first sound generating module, 300—second sound generating module, 310—first sound guide hole, and 400—display module; and

1200—electronic device, 1201—radio frequency unit, 1202—network module, 1203—audio output unit, 1204—input unit, 12041—graphics processing unit, 12042—microphone, 1205—sensor, 1206—display unit, 12061—display panel, 1207—user input unit, 12071—touch panel, 12072—another input device, 1208—interface unit, 1209—memory, 1210—processor, and 1211—power supply.

DESCRIPTION OF THE INVENTION

To clearly state the objectives, technical solutions, and advantages of this application, the technical solutions of this application will be clearly described below with reference to embodiments of this application and corresponding accompanying drawings. Apparently, the described embodiments are some embodiments rather than all the embodiments of this application. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It should be understood that the data so used may be interchanged in an appropriate condition, so that the embodiments of this application can be implemented in an order other than those illustrated or described herein. Objects distinguished by "first" and "second" are usually of one type, and the number of objects is not limited. For example, a first object may be one or more. In addition, "and/or" in the specification and claims denotes at least one of the connected objects, and the character "/" generally indicates an "or" relationship between the associated objects.

With reference to the accompanying drawings, the technical solutions disclosed in embodiments of this application are described through embodiments and application scenarios thereof.

Usually, to reduce manufacturing costs of electronic devices, electronic device manufacturers are encouraged to use low-cost housings. Such housings are usually relatively thin, or strength of a material is relatively low, so that strength of the housings is relatively low. Because a back cavity of a receiver or a back cavity of a loudspeaker in an electronic device is formed by a housing, in a case that the receiver or loudspeaker vibrates, the receiver or loudspeaker easily drives the housing with relatively low strength to vibrate through the back cavity, thereby causing the electronic device to generate noise or relatively large vibration due to vibration of the housing.

For example, when a user holds a mobile phone during a call, due to vibration of a receiver or a loudspeaker, a housing of the mobile phone vibrates and the user can directly feel the vibration of the housing.

Referring to FIG. 1 to FIG. 4, an embodiment of this application discloses an electronic device, where the disclosed electronic device includes a housing 100, a first sound generating module 200, and a second sound generating module 300.

The housing 100 is a basic component of the electronic device and can provide a mounting base for another component of the electronic device. In this embodiment of this application, the housing 100 has an accommodating space, the accommodating space includes a first accommodating cavity 110, and an inner wall of the housing 100 forms at least a portion of a cavity wall of the first accommodating cavity 110.

The first sound generating module 200 may be a loudspeaker or a speaker, and the first sound generating module 200 is disposed in the first accommodating cavity 110. The second sound generating module 300 may be a loudspeaker or a speaker, and the second sound generating module 300 is disposed in the accommodating space.

In a case that both the first sound generating module 200 and the second sound generating module 300 are in contact with the cavity wall, when the first sound generating module 200 is in a first operating state, the second sound generating module 300 is in a second operating state, the first sound generating module 200 outputs a first vibration signal to the housing 100, and the second sound generating module 300 outputs a second vibration signal to the housing 100, where a phase of the first vibration signal is opposite to that of the second vibration signal, so that vibration caused by the first vibration signal to the housing 100 and vibration caused by the second vibration signal to the housing 100 are canceled out by each other.

In a case that both the first sound generating module 200 and the second sound generating module 300 are spaced from the cavity wall, when the first sound generating module 200 is in a first operating state, the second sound generating module 300 is in a second operating state, sound waves emitted by the first sound generating module 200 form first sound waves in the first accommodating cavity 110, and sound waves emitted by the second sound generating module 300 form second sound waves in the first accommodating cavity 110, where a phase of the first sound waves is opposite to a phase of the second sound waves, and the first sound waves and the second sound waves with opposite phases can implement interference cancellation.

In a case that the first sound generating module 200 is in contact with the cavity wall and the second sound generating module 300 is spaced from the cavity wall, when the first sound generating module 200 is in a first operating state, the second sound generating module 300 is in a second operating state, the first sound generating module 200 outputs a first vibration signal to the housing 100, and sound waves emitted by the second sound generating module 300 form second sound waves in the first accommodating cavity 110, where a phase of the first vibration signal is the same as the phase of the first sound waves, that is, the phase of the first vibration signal is opposite to the phase of the second sound waves, so that vibration caused by the first vibration signal to the housing 100 and vibration caused by the second sound waves to the housing 100 are canceled out by each other.

The technical solutions adopted in this application can achieve the following beneficial effects:

In an electronic device disclosed in the embodiments of this application, in a case that both a first sound generating module and a second sound generating module are in contact with a cavity wall, when the first sound generating module is in a first operating state, the second sound generating module is in a second operating state, the first sound generating module outputs a first vibration signal to a housing, and the second sound generating module outputs a second vibration signal to the housing, where a phase of the first vibration signal is opposite to that of the second vibration signal, so that vibration caused by the first vibration signal to the housing and vibration caused by the second vibration signal to the housing are canceled out by each other.

In a case that both the first sound generating module and the second sound generating module are spaced from the cavity wall, when the first sound generating module is in a first operating state, the second sound generating module is in a second operating state, sound waves emitted by the first sound generating module form first sound waves in a first accommodating cavity, and sound waves emitted by the second sound generating module form second sound waves in the first accommodating cavity, where a phase of the first sound waves is opposite to a phase of the second sound waves, and the first sound waves and the second sound waves with opposite phases can implement interference cancellation.

In a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity, where a phase of the first vibration signal is the same as a phase the first sound waves, that is, the phase of the first vibration signal is opposite to a phase of the second sound waves, so that vibration caused by the first vibration signal to the housing and vibration caused by the second sound waves to the housing are canceled out by each other.

In a working process, when the housing 100 of the electronic device is found to vibrate, the second sound generating module 300 is controlled to be in the second operating state, so that the second sound generating module 300 outputs the second vibration signal to the housing 100, or the sound waves emitted by the second sound generating module 300 form the second sound waves in the first accommodating cavity 110, so that vibration caused by the first vibration signal to the housing 100 and vibration caused by the second vibration signal to the housing 100 are canceled out by each other, or the second sound waves emitted by the second sound generating module 300 cancel out the first sound waves, or vibration caused by the first vibration signal to the housing 100 and vibration caused by the second sound waves to the housing 100 are canceled out by each other, to prevent the housing 100 of the electronic device from vibrating, and prevent the electronic device from generating noise or relatively large vibration due to vibration of the housing 100, thereby preventing a user from directly feeling vibration of the housing 100, improving use experience of the user, and finally resolving a current problem that the housing vibrates when the electronic device outputs audio.

For example, the first sound generating module 200 may be a loudspeaker of the electronic device, and the second sound generating module 300 may be a receiver of the electronic device. The loudspeaker and the receiver are existing apparatuses in the electronic device. By utilizing the existing loudspeaker and receiver in the electronic device, it can be avoided that a new component is added inside the electronic device, so that the loudspeaker and the receiver can play a dual-purpose effect, thereby reducing internal stacking difficulty of the electronic device and reducing costs of the electronic device.

As mentioned above, the housing 100 has the accommodating space, the accommodating space includes the first accommodating cavity 110, and the inner wall of the housing 100 forms at least a portion of the cavity wall of the first accommodating cavity 110. In an optional embodiment, the housing 100 may include a rear cover 120 and a middle frame 130, and the rear cover 120 and the middle frame 130 may be enclosed to form the accommodating space. a raised part 131 may be disposed on the middle frame 130, and the raised part 131 may divide the accommodating space into a first mounting cavity 132 and the first accommodating cavity 110. The second sound generating module 300 may be disposed in the first mounting cavity 132, the raised part 131 may be provided with a sound guide channel 133, and the first mounting cavity 132 may be in communication with the first accommodating cavity 110 through the sound guide channel 133. In this case, sound waves emitted by the second sound generating module 300 may be transmitted to the first accommodating cavity 110 through the sound guide channel 133 to form the second sound waves in the first accommodating cavity 110, thereby ensuring that the second sound waves emitted by the second sound generating module 300 can cancel out the first sound waves, or vibration caused by the first vibration signal to the housing 100 and vibration caused by the second sound waves to the housing 100 can be canceled out by each other.

To enable the sound waves emitted by the second sound generating module 300 to be transmitted into the first accommodating cavity 110 as much as possible through the sound guide channel 133, in an optional embodiment, a first end of the sound guide channel 133 may be distributed opposite to the second sound generating module 300, the sound waves emitted by the second sound generating module 300 can directly enter the sound guide channel 133 through the first end of the sound guide channel 133, thereby being transmitted into the first accommodating cavity 110 as much as possible through the sound guide channel 133, reducing loss of the second sound waves, thus enhancing cancellation effect of the second sound waves on the first sound waves.

Optionally, the raised part 131 may have a first surface facing the second sound generating module 300 and a second surface facing the rear cover 120, the first end of the sound guide channel 133 may be located on the first surface, and a second end of the sound guide channel 133 may be located on the second surface. In this case, the sound waves emitted by the second sound generating module 300 enter through the first end of the sound guide channel 133, and are then transmitted from the second end of the sound guide channel 133. Because the second end of the sound guide channel 133 faces the rear cover 120, the sound waves emitted by the second sound generating module 300 can directly act on the rear cover 120, thereby relieving vibration of the rear cover 120. For example, the sound guide channel 133 may be a notch, a groove, or a through hole. This is not limited in this embodiment of this application.

In an optional embodiment, the second sound generating module 300 may include a module housing and a sound generating body, the module housing may be provided with a second accommodating cavity, and the sound generating body may be disposed in the second accommodating cavity. The module housing may be provided with a first sound guide hole 310, and the second accommodating cavity may be in communication with the sound guide channel 133 through the first sound guide hole 310, so that the sound waves emitted by the second sound generating module 300 are transmitted through the first sound guide hole 310 and the sound guide channel 133, thereby preventing the sound waves emitted by the second sound generating module 300 from leaking from the electronic device and resulting in a relatively poor sound feature of the electronic device, and preventing the electronic device from generating noise when outputting audio.

Optionally, the sound generating body may divide the second accommodating cavity into a front cavity and a back cavity, and the first sound guide hole 310 may be in communication with the front cavity. In this case, the first accommodating cavity 110 is a back cavity of the first sound generating module 200, and a front cavity of the second sound generating module 300 is in communication with the first accommodating cavity 110. Because phases of sound waves in the front cavity and the back cavity of the sound generating module are opposite, the first sound generating module 200 and the second sound generating module 300 may output same audio. By communicating the back cavity of the first sound generating module 200 with the front cavity of the second sound generating module 300, the phase of the first sound waves is opposite to that of the second sound waves in the first accommodating cavity 110. This arrangement manner can facilitate the electronic device to control audio output, an audio signal of the first sound generating module 200 and an audio signal of the second sound generating module 300 do not need to be inverted. In addition, the back cavity of the second sound generating module 300 can be prevented from generating noise, so that the sound feature of the electronic device is relatively high to prevent the electronic device from generating noise when outputting audio.

As described above, the second sound generating module 300 may be a receiver of the electronic device. For example, the housing 100 may be provided with a second sound guide hole 140, the second sound guide hole 140 may be in communication with outside of the electronic device, and the second sound generating module 300 is distributed opposite to the second sound guide hole 140, so that the second sound generating module 300 can be configured to eliminate vibration of the housing 100, and can also be configured to output audio, and the second sound generating module 300 can implement a dual-purpose effect.

Optionally, a sound insulation portion is movably disposed at the second sound guide hole 140, and the sound insulation portion is switchable between a first state and a second state. In a case that the sound insulation portion is in the first state, the sound insulation portion may block the second sound guide hole 140; or in a case that the sound insulation portion is in the second state, the sound insulation portion may avoid the second sound guide hole 140. In a working process, when the second sound generating module 300 needs to output audio, the sound insulation portion is controlled to be in the second state, so that the sound waves emitted by the second sound generating module 300 can be transmitted to outside of the electronic device through the second sound guide hole 140. When the second sound generating module 300 needs to eliminate vibration of the housing 100, the sound insulation portion is controlled to be in the first state, so that the sound waves emitted by the second sound generating module 300 cancel out the first sound waves. In this case, a use scenario of the second sound generating module 300 is increased, so that the second sound generating module 300 implements a dual-purpose effect, and this arrangement manner can cause the second sound generating module 300 to operate in both the first state and the second state.

As described above, the first sound generating module 200 may be a loudspeaker of the electronic device. For example, the electronic device may further include a display module 400, where the display module 400 may be disposed in the housing 100, a third sound guide hole is formed between the display module 400 and the housing 100, and the first sound generating module 200 is in communication with outside of the electronic device through the third sound guide hole. In this case, a sound emitted by the first sound generating module 200 can be transmitted to outside of the electronic device through the third sound guide hole, ensuring that the electronic device can normally output audio. In addition, the display module 400 is in clearance fit with the housing 100 to form the third sound guide hole. In this manner, it can be avoided that a hole is opened on the housing of the electronic device, thereby improving integrity of the electronic device.

Based on the electronic device disclosed in this embodiment of this application, this embodiment of this application further discloses a control method of the electronic device, where the electronic device includes the housing 100 having the accommodating space, the accommodating space includes the first accommodating cavity 110, and the inner wall of the housing 100 forms at least a portion of the cavity wall of the first accommodating cavity 110; the first sound generating module 200, disposed in the first accommodating cavity 110; and the second sound generating module 300, disposed in the accommodating space, where in a case that both the first sound generating module 200 and the second sound generating module 300 are in contact with the cavity wall, when the first sound generating module 200 is in the first operating state, the second sound generating module 300 is in the second operating state, the first sound generating module 200 outputs the first vibration signal to the housing 100, and the second sound generating module 300 outputs the second vibration signal to the housing 100; in a case that both the first sound generating module 200 and the second sound generating module 300 are spaced from the cavity wall, when the first sound generating module 200 is in the first operating state, the second sound generating module 300 is in the second operating state, the sound waves emitted by the first sound generating module 200 form the first sound waves in the first accommodating cavity 110, and the sound waves emitted by the second sound generating module 300 form the second sound waves in the first accommodating cavity 110; or in a case that the first sound generating module 200 is in contact with the cavity wall and the second sound generating module 300 is spaced from the cavity wall, when the first sound generating module 200 is in the first operating state, the second sound generating module 300 is in the second operating state, the first sound generating module 200 outputs the first vibration signal to the housing 100, and the sound waves emitted by the second sound generating module 300 form the second sound waves in the first accommodating cavity 110, where the phase of the first vibration signal is opposite to the phrase of the second vibration signal, the phase of the first sound waves is opposite to the phrase of the second sound waves, and the phase of the first vibration signal is the same as the phrase of the first sound waves; and the disclosed control method includes:

Step 101. Obtain a first audio parameter of the first sound generating module 200 in a case that the first sound generating module 200 is in the first operating state. In this case, the sound waves emitted by the first sound generating module 200 form the first sound waves in the first accommodating cavity 110.

Step 102. Control, according to the first audio parameter, the second sound generating module 300 to be in the second operating state, and control the second sound generating module 300 to operate according to a second audio parameter. In this case, the sound waves emitted by the second sound generating module 300 form the second sound waves in the first accommodating cavity 110.

In a working process, when the housing 100 of the electronic device is found to vibrate, the second sound generating module 300 is controlled to be in the second operating state, so that the second sound generating module 300 outputs the second vibration signal to the housing 100, or the sound waves emitted by the second sound generating module 300 form the second sound waves in the first accommodating cavity 110, so that vibration caused by the first vibration signal to the housing 100 and vibration caused by the second vibration signal to the housing 100 are canceled out by each other, or the second sound waves emitted by the second sound generating module 300 cancel out the first sound waves, or vibration caused by the first vibration signal to the housing 100 and vibration caused by the second sound waves to the housing 100 are canceled out by each other, to prevent the housing 100 of the electronic device from vibrating, and prevent the electronic device from generating noise or relatively large vibration due to vibration of the housing 100, thereby preventing a user from directly feeling vibration of the housing 100, improving use experience of the user, and finally resolving a current problem that the housing vibrates when the electronic device outputs audio.

In this embodiment of this application, the second sound generating module 300 operates under the second audio parameter according to the first audio parameter. Optionally, the first audio parameter may include a first amplitude and the second audio parameter may include a second amplitude. The control method may further include:

Step 201. Adjust the second amplitude according to the first amplitude, so that the second amplitude is equal to the first amplitude.

In this case, the phase of the first sound waves is opposite to that of the second sound waves, the amplitudes are equal, and the second sound waves can cancel out more of the first sound waves. In this manner, the first sound waves can be undoubtedly canceled out to a relatively high degree, which alleviates vibration of the housing 100.

In another optional embodiment, step 202. Adjust the second amplitude according to the first amplitude, so that the second amplitude is less than the first amplitude, and the second sound waves can not only slow down vibration of the housing 100, but also avoid excessive sound leakage of the electronic device.

In an optional embodiment, the housing 100 is provided with the second sound guide hole 140, where the second sound guide hole 140 is in communication with outside of the electronic device. The second sound generating module 300 is distributed opposite to the second sound guide hole 140, the sound insulation portion is movably disposed at the second sound guide hole 140, and the sound insulation portion is switchable between the first state and the second state. In a case that the sound insulation portion is in the first state, the sound insulation portion blocks the second sound guide hole 140; or in a case that the sound insulation portion is in the second state, the sound insulation portion avoids the second sound guide hole 140. Step 102 may include:

Step 301. Control, according to the first audio parameter, the second sound generating module 300 to be in the second operating state, control the second sound generating module 300 to operate according to the second audio parameter, and control the sound insulation portion to be in the first state.

In a working process, when the second sound generating module 300 needs to eliminate vibration of the housing 100, the sound insulation portion is controlled to be in the first state, so that the sound waves emitted by the second sound generating module 300 cancel out the first sound waves, and the second sound generating module 300 can be configured to eliminate vibration of the housing 100, and this arrangement manner can cause the second sound generating module 300 to operate in both the first state and the second state.

Optionally, the second sound generating module 300 may have a third operating state, and in a case that the second sound generating module 300 is in the third operating state, the sound waves emitted by the second sound generating module 300 can be transmitted to outside of the electronic device through the second sound guide hole 140. The control method may further include:

Step 401. Detect a current state of the first sound generating module 200 and/or a current state of the second sound generating module 300;

Step 402. Control the sound insulation portion to be in the second state in a case that the current state of the first sound generating module 200 is not the first operating state; and/or Step 403. Control the sound insulation portion to be in the second state in a case that the current state of the second sound generating module 300 is the third operating state.

In a working process, when the second sound generating module 300 needs to output audio, the sound insulation portion is controlled to be in the second state, so that the sound waves emitted by the second sound generating module 300 can be transmitted to outside of the electronic device through the second sound guide hole 140. In this case, the second sound generating module 300 can not only be configured to eliminate vibration of the housing 100, but also can be configured to output audio and increase a use scenario of the second sound generating module 300, so that the second sound generating module 300 implements a dual-purpose effect, and this arrangement manner can cause the second sound generating module 300 to operate in both the first state and the second state.

The electronic device disclosed in this embodiment of this application can implement processes implemented by the electronic device in the foregoing method embodiments, and details are not described herein again to avoid repetition.

This embodiment of this application further discloses a control apparatus of the electronic device, where the electronic device includes the housing 100, the housing 100 has the accommodating space, the accommodating space includes the first accommodating cavity 110, and the inner wall of the housing 100 forms at least a portion of the cavity wall of the first accommodating cavity 110; the first sound generating module 200, disposed in the first accommodating cavity 110; and the second sound generating module 300, disposed in the accommodating space, where in a case that both the first sound generating module 200 and the second sound generating module 300 are in contact with the cavity wall, when the first sound generating module 200 is in the first operating state, the second sound generating module 300 is in the second operating state, the first sound generating module 200 outputs the first vibration signal to the housing 100, and the second sound generating module 300 outputs the second vibration signal to the housing 100; in a case that both the first sound generating module 200 and the second sound generating module 300 are spaced from the cavity wall, when the first sound generating module 200 is in the first operating state, the second sound generating module 300 is in the second operating state, the sound waves emitted by the first sound generating module 200 form the first sound waves in the first accommodating cavity 110, and the sound waves emitted by the second sound generating module 300 form the second sound waves in the first accommodating cavity 110; or in a case that the first sound generating module 200 is in contact with the cavity wall and the second sound generating module 300 is spaced from the cavity wall, when the first sound generating module 200 is in the first operating state, the second sound generating module 300 is in the second operating state, the first sound generating module 200 outputs the first vibration signal to the housing 100, and the sound waves emitted by the second sound generating module 300 form the second sound waves in the first accommodating cavity 110, where the phase of the first vibration signal is opposite to the phrase of the second vibration signal, the phase of the first sound waves is opposite to the phrase of the second sound waves, and the phase of the first vibration signal is the same as the phrase of the first sound waves; and the disclosed control apparatus includes:

- an obtaining module, configured to obtain the first audio parameter of the first sound generating module 200 in a case that the first sound generating module 200 is in the first operating state; and
- a first control module, configured to control, according to the first audio parameter, the second sound generating module 300 to be in the second operating state, and control the second sound generating module 300 to operate according to the second audio parameter.

In a working process, when the obtaining module finds that the housing 100 of the electronic device vibrates, the first control module controls the second sound generating module 300 to be in the second operating state, so that the second sound generating module 300 outputs the second vibration signal to the housing 100, or the sound waves emitted by the second sound generating module 300 form the second sound waves in the first accommodating cavity 110, so that vibration caused by the first vibration signal to the housing 100 and vibration caused by the second vibration signal to the housing 100 are canceled out by each other, or the second sound waves emitted by the second sound generating module 300 cancel out the first sound waves, or vibration caused by the first vibration signal to the housing 100 and vibration caused by the second sound waves to the housing 100 are canceled out by each other, to prevent the housing 100 of the electronic device from vibrating, and prevent the electronic device from generating noise or relatively large vibration due to vibration of the housing 100, thereby preventing a user from directly feeling vibration of the housing 100, improving use experience of the user, and finally resolving a current problem that the housing vibrates when the electronic device outputs audio.

In this embodiment of this application, the second sound generating module 300 operates under the second audio parameter according to the first audio parameter. Optionally, the first audio parameter may include the first amplitude and the second audio parameter may include the second amplitude. The control apparatus may further include:

- an adjustment module, configured to adjust the second amplitude according to the first amplitude, so that the second amplitude is less than or equal to the first amplitude.

In this case, the adjustment module can cause the phase of the first sound waves to be opposite to that of the second sound waves and the amplitudes to be equal, and the second sound waves can cancel out more of the first sound waves. In this manner, the first sound waves can be undoubtedly canceled out to a relatively high degree, which alleviates vibration of the housing 100. Alternatively, the adjustment module can cause the second amplitude to be less than the first amplitude, so that the second sound waves can not only slow down vibration of the housing 100, but also avoid excessive sound leakage of the electronic device.

In an optional embodiment, the housing 100 is provided with the second sound guide hole 140, where the second sound guide hole 140 is in communication with outside of the electronic device. The second sound generating module 300 is distributed opposite to the second sound guide hole 140, the sound insulation portion is movably disposed at the second sound guide hole 140, and the sound insulation portion is switchable between the first state and the second state. In a case that the sound insulation portion is in the first state, the sound insulation portion blocks the second sound guide hole 140; or in a case that the sound insulation portion is in the second state, the sound insulation portion avoids the second sound guide hole 140. The first control module may include:

- a first control unit, configured to control, according to the first audio parameter, the second sound generating module 300 to be in the second operating state, and control the second sound generating module 300 to operate according to the second audio parameter; and
- a second control unit, configured to control the sound insulation portion to be in the first state.

In a working process, when the second sound generating module 300 needs to eliminate vibration of the housing 100, the second control unit can control the sound insulation portion to be in the first state, so that the sound waves emitted by the second sound generating module 300 cancel out the first sound waves, and the second sound generating module 300 can be configured to eliminate vibration of the housing 100, and this arrangement manner can cause the second sound generating module 300 to operate in both the first state and the second state.

Optionally, the second sound generating module 300 may have the third operating state, and in a case that the second sound generating module 300 is in the third operating state, the sound waves emitted by the second sound generating module 300 can be transmitted to outside of the electronic device through the second sound guide hole 140. The control apparatus may further include:

a detection module, configured to detect the current state of the first sound generating module 200 and/or the current state of the second sound generating module 300;

a second control module, configured to control the sound insulation portion to be in the second state in a case that the current state of the first sound generating module 200 is not the first operating state; and/or, a third control module, configured to control the sound insulation portion to be in the second state in a case that the current state of the second sound generating module 300 is the third operating state.

In a working process, when the second sound generating module 300 needs to output audio, the sound insulation portion is controlled to be in the second state, so that the sound waves emitted by the second sound generating module 300 can be transmitted to outside of the electronic device through the second sound guide hole 140. In this case, the second sound generating module 300 can not only be configured to eliminate vibration of the housing 100, but also can be configured to output audio and increase a use scenario of the second sound generating module 300, so that the second sound generating module 300 implements a dual-purpose effect, and this arrangement manner can cause the second sound generating module 300 to operate in both the first state and the second state.

Figure 5:
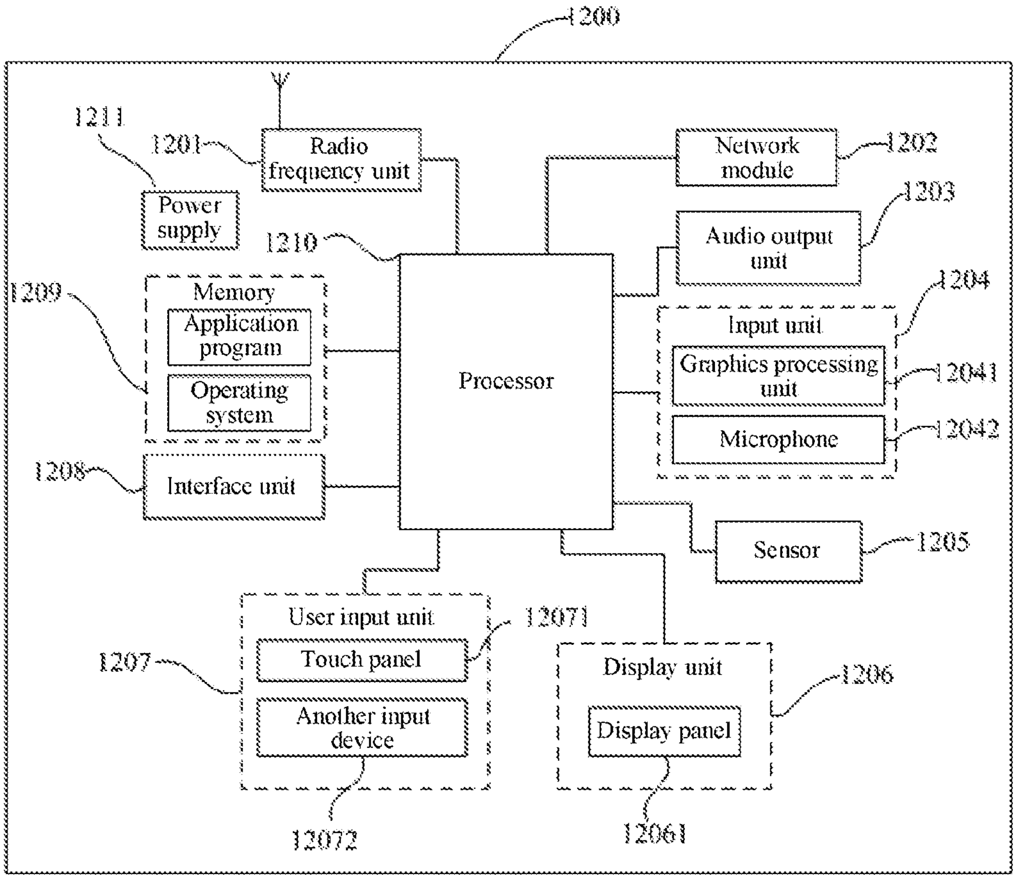
FIG. 5 is a schematic diagram of an electronic device.

FIG. 5 is a schematic diagram of a hardware structure of an electronic device for implementing the embodiments of this application.

The electronic device 1200 includes, but is not limited to: components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the electronic device shown in FIG. 5 constitutes no limitation on the electronic device, and the electronic device may include more or fewer components than those shown in the figure, or some components may be combined, or a different component deployment may be used. In the embodiments of this application, the electronic device includes, but is not limited to, a mobile phone, a tablet computer, a notebook computer, a palm computer, an in-vehicle terminal, a wearable device, and a pedometer.

The sensor 1205 is configured to obtain a first audio parameter of a first sound generating module 200 in a case that the first sound generating module 200 is in a first operating state; and the processor 1210 controls, according to the first audio parameter, a second sound generating module 300 to be in a second operating state, and controls the second sound generating module 300 to operate according to a second audio parameter. In a working process, when the sensor 1205 finds that a housing 100 of the electronic device vibrates, the processor 1210 controls the second sound generating module 300 to be in the second operating state, so that the second sound generating module 300 outputs a second vibration signal to the housing 100, or sound waves emitted by the second sound generating module 300 form second sound waves in a first accommodating cavity 110, so that vibration caused by a first vibration signal to the housing 100 and vibration caused by the second vibration signal to the housing 100 are canceled out by each other, or the second sound waves emitted by the second sound generating module 300 cancel out the first sound waves, or vibration caused by the first vibration signal to the housing 100 and vibration caused by the second sound waves to the housing 100 are canceled out by each other, to prevent the housing 100 of the electronic device from vibrating, and prevent the electronic device from generating noise or relatively large vibration due to vibration of the housing 100, thereby preventing a user from directly feeling vibration of the housing 100, improving use experience of the user, and finally resolving a current problem that the housing vibrates when the electronic device outputs audio.

It should be understood that in this embodiment of this application, the radio frequency unit 1201 may be configured to send and receive a signal during an information receiving and sending process or a call process. For example, the radio frequency unit receives downlink data from a base station, and then delivers the downlink data to the processor 1210 for processing; and in addition, sends uplink data to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may further communicate with a network or another device through a wireless communication system.

The electronic device provides wireless broadband Internet access to the user through the network module 1202, for example, to help the user to receive and send an email, browse a webpage, access stream media, and the like.

The audio output unit 1203 may convert audio data received by the radio frequency unit 1201 or the network module 1202 or stored in the memory 1209 into an audio signal and output the audio signal as sound. Moreover, the audio output unit 1203 may further provide an audio output (such as call signal receiving sound or message receiving sound) related to a specific function executed by the electronic device 1200. The audio output unit 1203 includes a loudspeaker, a buzzer, a receiver, and the like.

The input unit 1204 is configured to receive an audio signal or a video signal. The input unit 1204 may include a graphics processing unit (GPU) 12041 and a microphone 12042. The graphics processing unit 12041 performs processing on image data of a static picture or a video that is obtained by an image acquisition apparatus (for example, a camera) in a video acquisition mode or an image acquisition mode. A processed image frame may be displayed on the display unit 1206. The image frame processed by the GPU 12041 may be stored in the memory 1209 (or another storage medium) or transmitted through the radio frequency unit 1201 or the network module 1202. The microphone 12042 may receive a sound and can process such a sound as audio data. The processed audio data may be converted, in a phone call mode, into a format that may be sent to a mobile communication base station through the radio frequency unit 1201 for output.

The electronic device 1200 further includes at least one sensor 1205 such as an optical sensor, a motion sensor, and another sensor. For example, the optical sensor includes an ambient light sensor and a proximity sensor, where the ambient light sensor may adjust luminance of the display panel 12061 according to brightness of the ambient light, and the proximity sensor may switch off the display panel 12061 and/or backlight when the electronic device 1200 is moved to the ear. As one type of motion sensor, an acceleration sensor may detect magnitude of accelerations in various directions (generally on three axes), may detect magnitude and a direction of gravity when static, and may be configured to recognize a posture of the electronic device (such as horizontal and vertical screen switching, a related game, and magnetometer posture calibration), a function related to vibration recognition (such as a pedometer and a knock), and the like. The sensor 1205 may further include a fingerprint sensor, a pressure sensor, an iris sensor, a molecular sensor, a gyroscope, a barometer, a hygrometer, a thermometer, an infrared sensor, and the like, and details are not described herein again.

The display unit 1206 is configured to display information input by the user or information provided for the user. The display unit 1206 may include a display panel 12061. The display panel 12061 may be configured in a form of a liquid crystal display (LCD), an organic light-emitting diode (OLED), or the like.

The user input unit 1207 may be configured to receive inputted digital or character information, and generate a key signal input related to user settings and function control of the electronic device 1200. For example, the user input unit 1207 includes a touch panel 12071 and another input device 12072. The touch panel 12071, also referred to as a touchscreen, may collect a touch operation of a user on or near the touch panel (such as an operation of the user on or near the touch panel 12071 by using any suitable object or attachment, such as a finger or a touch pen). The touch panel 12071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1210, and receives and executes a command transmitted by the processor 1210. In addition, the touch panel 12071 may be implemented by using various types, such as a resistive type, a capacitive type, an infrared type, and a surface acoustic wave type. In addition to the touch panel 12071, the user input unit 1207 may further include the input device 12072. For example, the another input device 12072 may include, but not limited to, a physical keyboard, a functional key (such as a volume control key or a switch key), a track ball, a mouse, and a joystick, which are not described herein in detail.

Optionally, the touch panel 12071 may cover the display panel 12061. After detecting a touch operation on or near the touch panel, the touch panel 12071 transfers the touch operation to the processor 1210, to determine a type of a touch event. Then, the processor 1210 provides a corresponding visual output on the display panel 12061 according to the type of the touch event. Although, in FIG. 5, the touch panel 12071 and the display panel 12061 are used as two separate parts to implement input and output functions of the electronic device, in some embodiments, the touch panel 12071 and the display panel 12061 may be integrated to implement the input and output functions of the electronic device, which is not limited herein.

The interface unit 1208 is an interface for connecting an external apparatus to the electronic device 1200. For example, the external apparatus may include a wired or wireless headset port, an external power supply (or a battery charger) port, a wired or wireless data port, a storage card port, a port configured to connect an apparatus having an identification module, an audio input/output (I/O) port, a video I/O port, an earphone port, and the like. The interface unit 1208 may be configured to receive an input (such as data information or electric power) from the external apparatus and transmit the received input to one or more elements in the electronic device 1200 or may be configured to transmit data between the electronic device 1200 and the external apparatus.

The memory 1209 may be configured to store a software program and various data. The memory 1209 may mainly include a program storage area and a data storage area. The program storage area may store an operating system, an application program required by at least one function (for example, a sound playback function and an image display function), and the like. The data storage area may store data (for example, audio data and a phone book) and the like created according to use of the electronic device. In addition, the memory 1209 may include a high-speed random access memory, and may further include a nonvolatile memory, such as at least one magnetic disk storage device, a flash memory, or another volatile solid-state storage device.

The processor 1210 is a control center of the electronic device, and connects various parts of the entire electronic device by using various interfaces and lines. By running or executing the software program and/or module stored in the memory 1209, and invoking data stored in the memory 1209, the processor performs various functions of the electronic device and processes data, thereby performing overall monitoring on the electronic device. The processor 1210 may include one or more processing units. Optionally, the processor 1210 may integrate an application processor and a modem processor. The application processor mainly processes an operating system, a user interface, an application program, and the like. The modem processor mainly processes wireless communication. It may be understood that, the modem processor may not be integrated into the processor 1210.

The electronic device 1200 may further include a power supply 1211 (such as a battery) for supplying power to the components. The power supply 1211 may be logically connected to the processor 1210 by using a power management system, thereby implementing functions such as charging, discharging, and power consumption management by using the power management system.

In addition, the electronic device 1200 includes some functional modules that are not shown, and details are not described herein again.

Optionally, the embodiments of this application further disclose a terminal device, including a processor 1210, a memory 1209, and a program or an instruction stored in the memory 1209 and executable on the processor 1210. When executed by the processor 1210, the program or the instruction implements processes of any one of the foregoing method embodiments, and can achieve the same technical effects. To avoid repetition, details are not described herein again.

The electronic device disclosed in the embodiments of this application may be a smart phone, a tablet computer, an e-book reader, a wearable device (such as a smart watch), an electronic game machine, and the like, and the embodiments of this application do not limit a type of the electronic device.

The embodiments of this application further disclose a non-transitory computer-readable storage medium, storing a program or an instruction. When executed by the processor, the program or the instruction implements processes of any one of the foregoing method embodiments, and can achieve the same technical effects. To avoid repetition, details are not described herein again. The non-transitory computer-readable storage medium is, for example, a read-only memory (ROM), a random access memory (RAM), a magnetic disk, or an optical disc.

The embodiments of this application further disclose an apparatus, configured to perform the control method according to the foregoing embodiments.

The embodiments of this application further disclose a chip, including a processor and a communication interface, the communication interface is coupled to the processor, and the processor is configured to run a program or an instruction to implement the control method according to the foregoing embodiments.

The embodiments of this application further disclose a non-transitory computer program product, stored in a non-volatile storage medium. The non-transitory computer program product performs steps of the control method according to any one of the foregoing embodiments when executed by at least one processor.

The embodiments of this application further disclose a control method, including:

obtaining the first audio parameter of the first sound generating module 200 in a case that the first sound generating module 200 is in the first operating state; and controlling, according to the first audio parameter, the second sound generating module 300 to be in the second operating state, and controlling the second sound generating module 300 to operate according to the second audio parameter.

It should be noted that, the terms “include”, “comprise”, or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence “comprising one” does not exclude that there are still other same elements in the processes, methods, objects, or apparatuses. Furthermore, it should be noted that a scope of the methods and apparatuses in the implementations of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the method described in the embodiments of this application.

The embodiments of this application have been described above with reference to the accompanying drawings. This application is not limited to the embodiments described above, and the embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An electronic device, comprising:

a housing, having an accommodating space, wherein the accommodating space comprises a first accommodating cavity, and an inner wall of the housing forms at least a portion of a cavity wall of the first accommodating cavity;

a first sound generating module, disposed in the first accommodating cavity;

a second sound generating module, disposed in the accommodating space; wherein in a case that both the first sound generating module and the second sound generating module are in contact with the cavity wall, when the first sound generating module is in a first operating state, the second sound generating module is in a second operating state, the first sound generating module outputs a first vibration signal to the housing, and the second sound generating module outputs a second vibration signal to the housing, wherein a phase of the first vibration signal is opposite to a phase of the second vibration signal;

in a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity; wherein the phase of the first vibration signal is opposite to a phase of the second sound waves.

2. The electronic device according to claim 1, wherein the housing comprises a rear cover and a middle frame, the rear cover and the middle frame are enclosed to form the accommodating space, a raised part is disposed on the middle frame, the raised part divides the accommodating space into a first mounting cavity and the first accommodating cavity, the second sound generating module is disposed in the first mounting cavity, the raised part is provided with a sound guide channel, and the first mounting cavity is in communication with the first accommodating cavity through the sound guide channel.

3. The electronic device according to claim 2, wherein a first end of the sound guide channel is distributed opposite to the second sound generating module.

4. The electronic device according to claim 2, wherein the raised part has a first surface facing the second sound generating module and a second surface facing the rear cover, a first end of the sound guide channel is located on the first surface, and a second end of the sound guide channel is located on the second surface.

5. The electronic device according to claim 2, wherein the second sound generating module comprises a module housing and a sound generating body, the module housing is provided with a second accommodating cavity, the sound generating body is disposed in the second accommodating cavity, the module housing is provided with a first sound guide hole, and the second accommodating cavity is in communication with the sound guide channel through the first sound guide hole.

6. The electronic device according to claim 5, wherein the sound generating body divides the second accommodating cavity into a front cavity and a back cavity, and the first sound guide hole is in communication with the front cavity.

7. The electronic device according to claim 1, wherein the housing is provided with a second sound guide hole, the second sound guide hole is in communication with outside of the electronic device, and the second sound generating module is distributed opposite to the second sound guide hole.

8. The electronic device according to claim 7, wherein a sound insulation portion is movably disposed at the second sound guide hole, the sound insulation portion is switchable between a first state and a second state, and in a case that the sound insulation portion is in the first state, the sound insulation portion blocks the second sound guide hole; or in a case that the sound insulation portion is in the second state, the sound insulation portion avoids the second sound guide hole.

9. A control method of an electronic device, wherein the electronic device comprises a housing, the housing has an accommodating space, the accommodating space comprises a first accommodating cavity, and an inner wall of the housing forms at least a portion of a cavity wall of the first accommodating cavity; a first sound generating module, disposed in the first accommodating cavity; a second sound generating module, disposed in the accommodating space; wherein in a case that both the first sound generating module and the second sound generating module are in contact with the cavity wall, when the first sound generating module is in a first operating state, the second sound generating module is in a second operating state, the first sound generating module outputs a first vibration signal to the housing, and the second sound generating module outputs a second vibration signal to the housing, wherein a phase of the first vibration signal is opposite to a phase of the second vibration signal; or in a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity; wherein the phase of the first vibration signal is opposite to a phase of the second sound waves; and the control method comprises:

obtaining a first audio parameter of the first sound generating module in a case that the first sound generating module is in the first operating state; and controlling, according to the first audio parameter, the second sound generating module to be in the second operating state, and controlling the second sound generating module to operate according to a second audio parameter.

10. The control method according to claim 9, wherein the first audio parameter comprises a first amplitude and the second audio parameter comprises a second amplitude; and the control method further comprises:

adjusting the second amplitude according to the first amplitude, so that the second amplitude is less than or equal to the first amplitude.

11. The control method according to claim 9, wherein the housing is provided with a second sound guide hole, the second sound guide hole is in communication with outside of the electronic device, the second sound generating module is distributed opposite to the second sound guide hole, a sound insulation portion is movably disposed at the second sound guide hole, the sound insulation portion is switchable between a first state and a second state, and in a case that the sound insulation portion is in the first state, the sound insulation portion blocks the second sound guide hole; or in a case that the sound insulation portion is in the second state, the sound insulation portion avoids the second sound guide hole; and the controlling, according to the first audio parameter, the second sound generating module to be in the second operating state, and controlling the second sound generating module to operate according to a second audio parameter comprises:

controlling, according to the first audio parameter, the second sound generating module to be in the second operating state, controlling the second sound generating module to operate according to the second audio parameter, and controlling the sound insulation portion to be in the first state.

12. The control method according to claim 11, wherein the second sound generating module has a third operating state, and in a case that the second sound generating module is in the third operating state, sound waves emitted by the second sound generating module are transmittable to outside of the electronic device through the second sound guide hole; and the control method further comprises:

detecting a current state of the first sound generating module and/or a current state of the second sound generating module;

controlling the sound insulation portion to be in the second state in a case that the current state of the first sound generating module is not the first operating state; and/or, controlling the sound insulation portion to be in the second state in a case that the current state of the second sound generating module is the third operating state.

13. A non-transitory computer-readable storage medium, storing a program or an instruction; wherein when the program or the instruction is executed by a processor, steps of the control method according to claim 9 are implemented.

14. A chip, comprising a processor and a communication interface coupled to the processor, wherein the processor is configured to execute a program or an instruction of a terminal device to implement steps of the control method according to claim 9.

15. A non-transitory computer program product, stored in a non-volatile storage medium; wherein when the non-transitory computer program product is executed by at least one processor, steps of the control method according to claim 9 are performed.

16. A terminal device, comprising a housing, the housing has an accommodating space, the accommodating space comprises a first accommodating cavity, and an inner wall of the housing forms at least a portion of a cavity wall of the first accommodating cavity; a first sound generating module, disposed in the first accommodating cavity; a second sound generating module, disposed in the accommodating space;

wherein in a case that both the first sound generating module and the second sound generating module are in contact with the cavity wall, when the first sound generating module is in a first operating state, the second sound generating module is in a second operating state, the first sound generating module outputs a first vibration signal to the housing, and the second sound generating module outputs a second vibration signal to the housing, wherein a phase of the first vibration signal is opposite to a phase of the second vibration signal; or in a case that the first sound generating module is in contact with the cavity wall and the second sound generating module is spaced from the cavity wall, when the first sound generating module is in a first operating state, the second sound generating module is in a second operating state, the first sound generating module outputs a first vibration signal to the housing, and sound waves emitted by the second sound generating module form second sound waves in the first accommodating cavity; wherein the phase of the first vibration signal is opposite to a phase of the second sound waves;

wherein the terminal device further comprises a processor, a memory, and a program or an instruction stored in the memory and executable on the processor; wherein the program or the instruction, when executed by the processor, causes the terminal device to perform:

obtaining a first audio parameter of the first sound generating module in a case that the first sound generating module is in the first operating state; and controlling, according to the first audio parameter, the second sound generating module to be in the second operating state, and controlling the second sound generating module to operate according to a second audio parameter.

17. The terminal device according to claim 16, wherein the first audio parameter comprises a first amplitude and the second audio parameter comprises a second amplitude; and the program or the instruction, when executed by the processor, causes the terminal device to further perform:

adjusting the second amplitude according to the first amplitude, so that the second amplitude is less than or equal to the first amplitude.

18. The terminal device according to claim 16, wherein the housing is provided with a second sound guide hole, the second sound guide hole is in communication with outside of the terminal device, the second sound generating module is distributed opposite to the second sound guide hole, a sound insulation portion is movably disposed at the second sound guide hole, the sound insulation portion is switchable between a first state and a second state, and in a case that the sound insulation portion is in the first state, the sound insulation portion blocks the second sound guide hole; or in a case that the sound insulation portion is in the second state, the sound insulation portion avoids the second sound guide hole; and the program or the instruction, when executed by the processor, causes the terminal device to perform:

controlling, according to the first audio parameter, the second sound generating module to be in the second operating state, controlling the second sound generating module to operate according to the second audio parameter, and controlling the sound insulation portion to be in the first state.

19. The terminal device according to claim 18, wherein the second sound generating module has a third operating state, and in a case that the second sound generating module is in the third operating state, sound waves emitted by the second sound generating module are transmittable to outside of the terminal device through the second sound guide hole; and the program or the instruction, when executed by the processor, causes the terminal device to further perform:

detecting a current state of the first sound generating module and/or a current state of the second sound generating module;

controlling the sound insulation portion to be in the second state in a case that the current state of the first sound generating module is not the first operating state; and/or, controlling the sound insulation portion to be in the second state in a case that the current state of the second sound generating module is the third operating state.

* * * * *